United States Patent

[11] 3,620,764

[72] Inventor Harley E. Watkins
Golden, Colo.
[21] Appl. No. 755,053
[22] Filed Aug. 26, 1968
[45] Patented Nov. 16, 1971
[73] Assignee Pet Incorporated
St. Louis, Mo.
The portion of the term of the patent subsequent to Jan. 26, 1988, has been disclaimed.

[54] METHOD OF CONTROLLING THE FUNCTIONAL CHARACTERISTICS OF FLOUR BY MICROWAVE TREATMENT OF GRAIN
6 Claims, 3 Drawing Figs.

[52] U.S. Cl. .................................................. 99/93, 99/80 PS
[51] Int. Cl. ...................................................... A23l 1/10
[50] Field of Search ............................................ 99/80.1, 93

[56] References Cited
UNITED STATES PATENTS
2,356,635 8/1944 Waldschmidt et al. ........ 99/93 X
2,880,093 3/1959 Kuhlmann et al. ............. 99/93

Primary Examiner—Raymond N. Jones
Attorney—Gravely, Lieder & Woodruff

ABSTRACT: A method of controlling the functional characteristics of flour produced from cereal grains by treating the grain prior to milling with microwave energy under controlled conditions of time, moisture, power, temperature and frequency.

METHOD OF CONTROLLING THE FUNCTIONAL CHARACTERISTICS OF FLOUR BY MICROWAVE TREATMENT OF GRAIN

BACKGROUND OF THE INVENTION

In my copending application Ser. No. 714,412, filed Mar. 20, 1968, I have shown that applying microwave energy to grain having a moisture content above the level at which the grain is to be milled allows the grain to be milled without long tempering times.

This invention is directed to the treatment of grain prior to milling under controlled conditions. Thus, using the present invention, it is possible to change the functional characteristics of hard wheat, soft wheat and durum wheat. For example, the quality of bread and macaroni can be improved when produced from flours that were milled from microwave treated grain.

SUMMARY OF THE INVENTION

A method of controlling the functional characteristics of flour produced from cereal grains by treating the grain prior to milling with microwave energy under controlled conditions of time, moisture, power, temperature and frequency.

DETAILED DESCRIPTION

Figure 1:
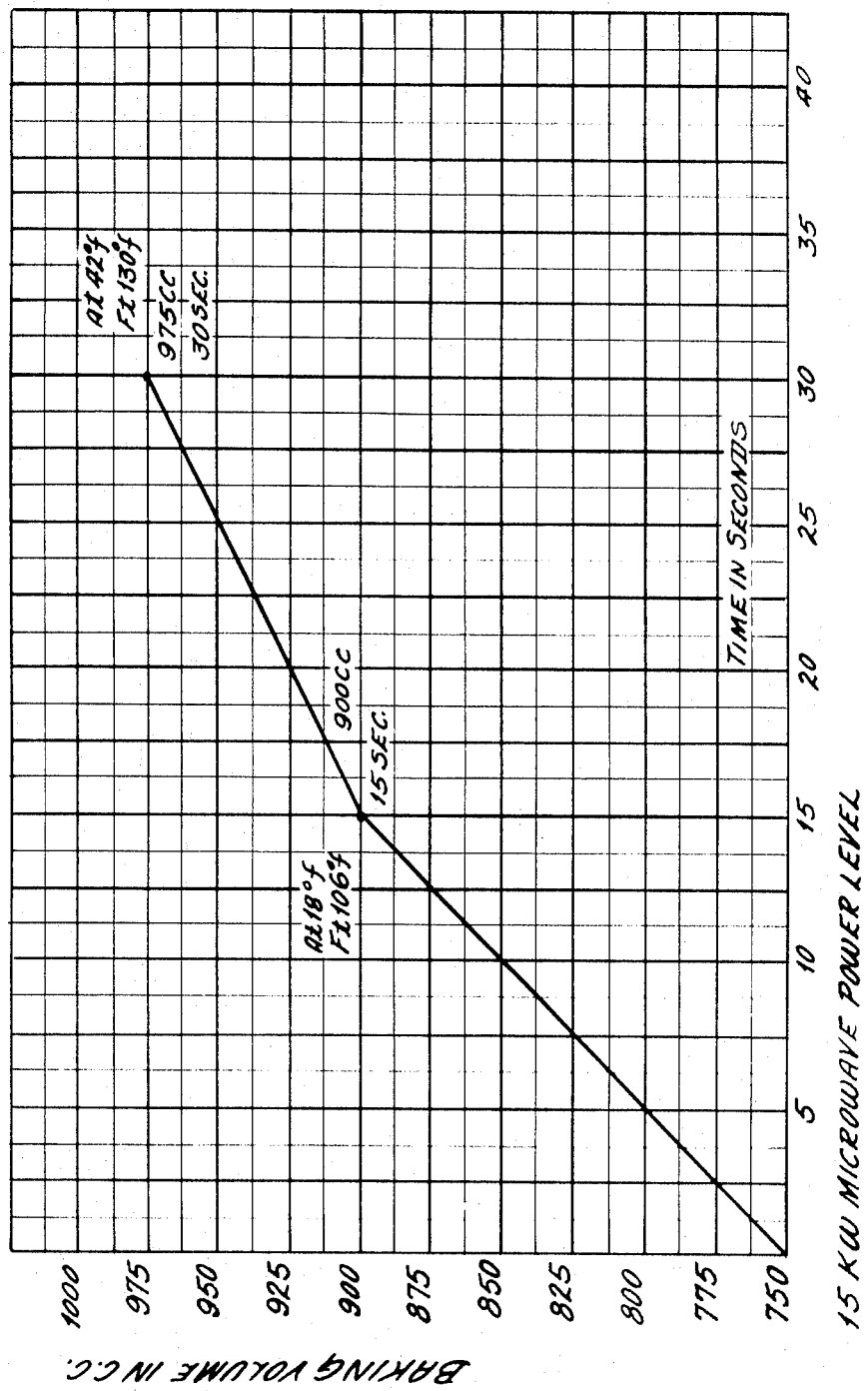

Flour having different functional characteristics is necessary to make the different types of products made from flour. In other words, bread, macaroni, crackers and soup flour all require that the flour have different functional characteristics. For example, it is desirable to have high volume characteristics for bread and extremely low volume characteristics for crackers and soup flours. The present invention involves the treating of grain at moisture levels generally below the mill moisture levels with microwave energy preferably at 915 MHz. In making this product, a microwave oven, such as a Cryodry 50 KW continuous belt unit, was used. This particular unit transmits microwave energy at 915 MHz. through a waveguide in a "S" configuration in the top of the cavity, in which a leaky slot system is employed.

Wheat flour contains two principal protein components, gliadin and glutenin, commonly considered as one factor under the name of gluten. In a properly made dough, the gluten takes the form of an interwoven network of fibrils which constitute the skeletal structure of the mass of dough. The nature of this network, and consequently the number and nature of the individual gluten fibrils, must be such that the dough can be inflated with gas to a suitable degree without serious distortion of the moulded shape and can continue to exhibit a fine and even vesiculation internally.

The every level of the microwave field can vary from about 1 kw. to about 1,000 kw., with a preferred energy level of about 10 kw. to about 50 kw. The treatment time can vary from about 1 sec. to about 10 min. Preferably from about 10 sec. to about 2 min. The frequency of the field can vary from about 30 MHz. to about 3,000 MHz. with a preferred frequency of about 915 MHz. to about 2450 MHz.

As will be seen hereinafter, treatment of grain, particularly from about 10 sec. to about 120 sec. tends to improve the quality of bread, or cakes, and macaroni made from a flour milled from so-treated grain. Treatment of the grain of greater than 120 sec. also tends to alter the characteristics of the flour. This can also be achieved by treating at higher power levels. Nine hundred and fifteen Megahertz is the most suitable practical frequency and gives the best results.

The microwave treatment and effect is dependent on the latent content of water in the grain hull, aleurone layer and endosperm. The microwave effect is only produced by the presence of moisture. The molecules of water have an electric dipole movement, and they act as if one side were positive and the other negative. When such polar molecules are present in an electric field, they try to align themselves with the electromagnetic field. In the alternating field the molecules of water experience a rotational force each time the electric field reverses. These rapidly repeated oscillations cause internal friction, thus, phenomenal change occurs in the grain. The articulate control of this process when applied to the grain gives a flour of controlled characteristics as shown in the following examples.

EXAMPLE NO. 1

An untreated control sample of hard wheat bakes with a 750 cc. volume. After treatment at 15 kw. and 915 MHz. for 15 seconds at approximately 12 percent moisture a $\Delta t$ 18° F. and a final temperature ($Ft$) of 106° is obtained. The baking volume characteristics of the flour milled from this treated wheat is 900 cc. After a treatment of the same grain for 30 seconds a $\Delta t$ of 42° F. and $ft$ of 130° F. is obtained. The baking volume of flour from this grain is raised to 975 cc. This is illustrated in FIG. 1. Similar baking volume results are obtained when the power level is raised to 20 kilowatts. However, the treatment time is shortened and there is more control of the process as the reverse of this baking volume action will take place after the peak volume characteristics are reached. This is shown hereinafter.

EXAMPLE NO. 1A

Figure 2:
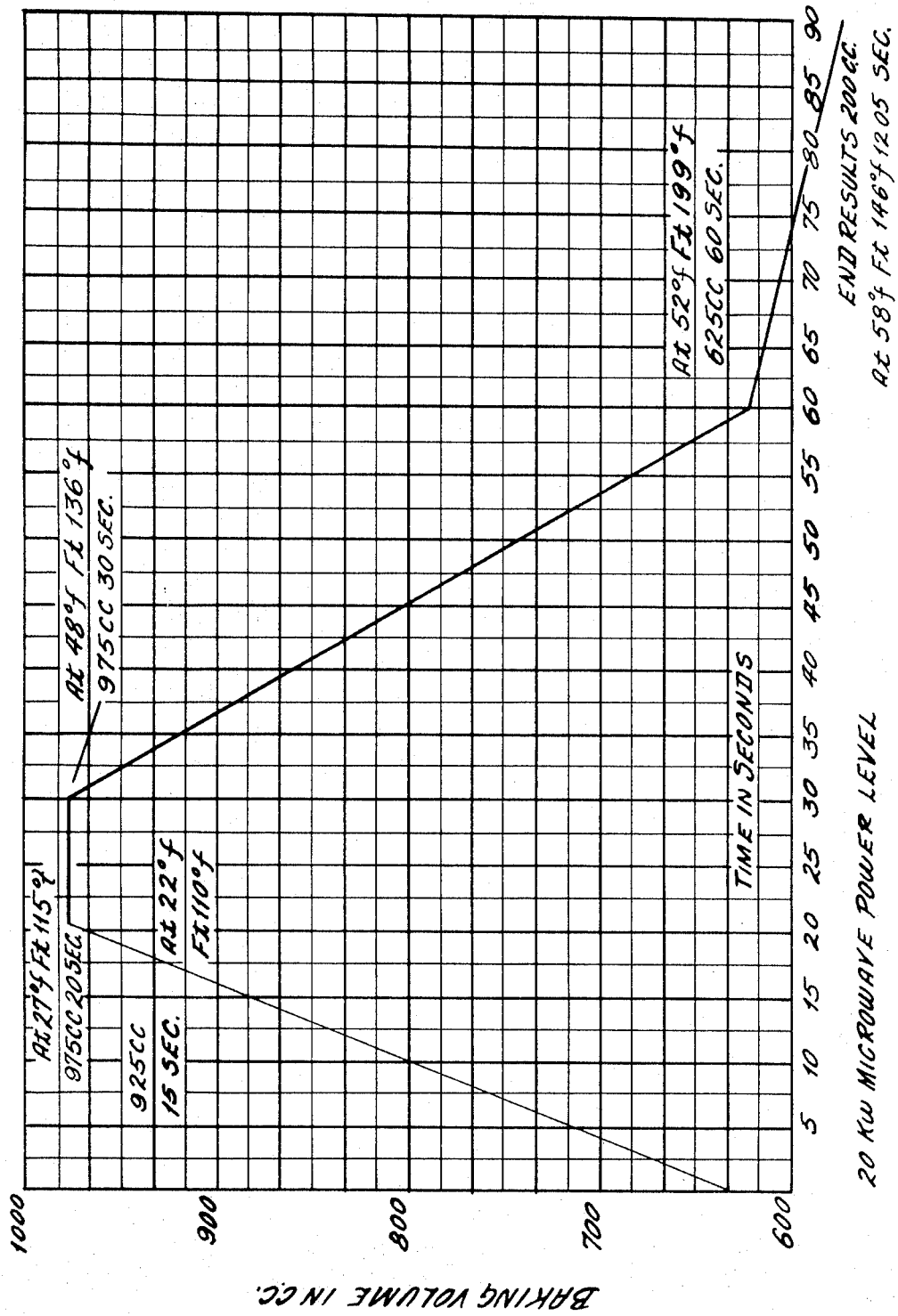

A control sample of hard winter grain without treatment bakes at 600 cc. to 625 cc. volume. After microwave treatment for 15 seconds at a $\Delta t$ 22° F. with a $Ft$ 110° F. the baking volume of flour milled from the wheat is 925 cc. A 20-second treatment gives an even higher baking volume of 975 cc. A 30-second treatment under the same conditions gives the same volume change. This is shown in FIG. 2. However, there is a difference in temperatures; a $\Delta t$ of 27° F. for 20-second treatment compared to a $\Delta t$ of 48° F. for the 30-second treatment. Also, a $Ft$ of 115° F. at 20 second compared to an $Ft$ of 136° F. at 30 seconds. This gives the best volume characteristics of this grain due to the particulate control of microwave bombardment of the whole wheat grain.

The reverse effect is created by longer exposure of the grain.

EXAMPLE NO. 1B

The same wheat as treated in example No. 1A is given a similar treatment for 60 seconds resulting in $\Delta t$ of 52° F. and $Ft$ of 149° F. Flour milled from this grain gave a baking volume of 625 cc. FIG. 2 also shows these results. Further treatment of the grain for 120 seconds resulted in flour having 200 cc. volume baking characteristics which has no commercial value as a bread or cake baking flour but has a very definite place as cracker and soup flours and other commercial applications in paper and adhesives.

EXAMPLE NO. 2

Figure 3:
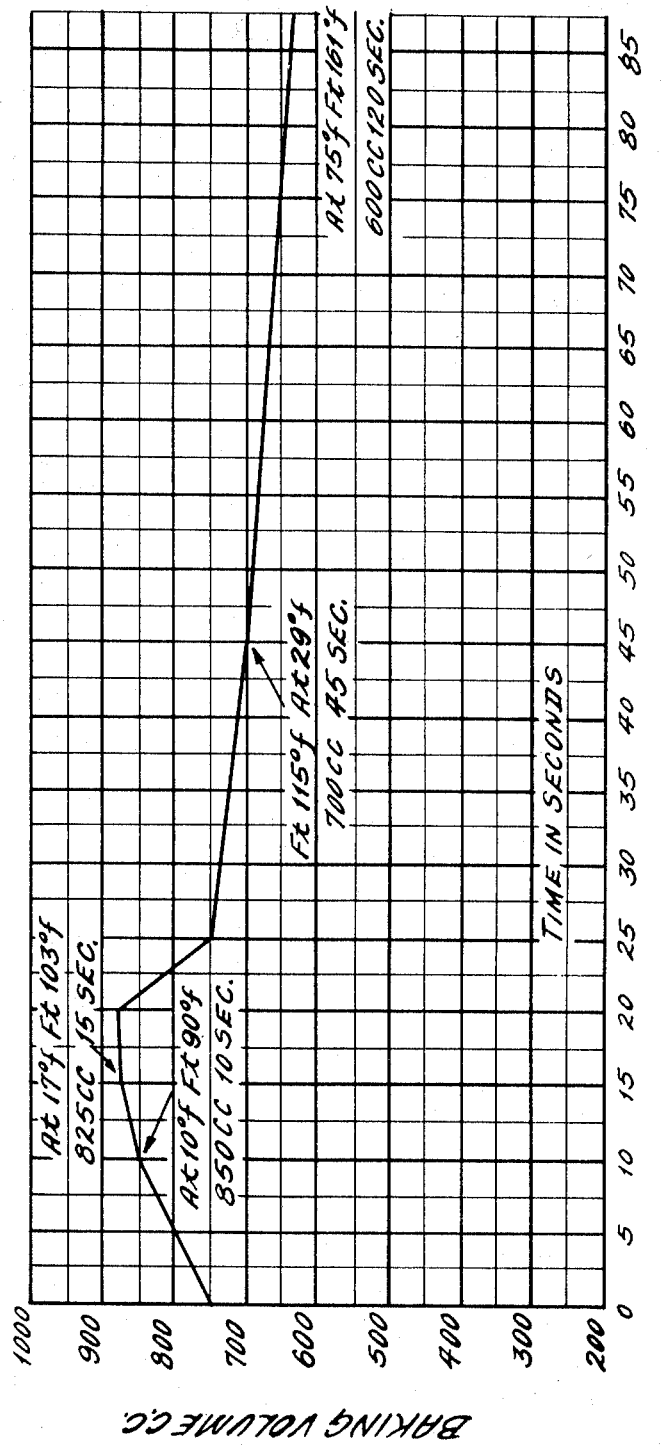

FIG. 3 shows a control sample of soft wheat baked with a volume of 750 cc. After microwave treatment of various time intervals at 20 kw., the volume characteristics change differed somewhat from hard winter wheat. At 10 seconds, with a low $\Delta t$ of 10° F. and a $Ft$ of 90° F., a volume increase of 100 cc. resulted. Greater volume of 875 cc. was produced at 15 to 20 seconds exposure at a $\Delta t$ of 17° F. and $Ft$ of 103° F. This seemed to be the peak height during this test. Afterwards, reduction of the product volume took place at a much slower pace than with hard winter wheat. A volume of 600 cc. resulted after 120-second treatment with a $\Delta t$ of 75° F. and an $Ft$ of 161° F. Treatment of 300 seconds produced volumes of less than 250 cc. which would be useful for cracker or soup flour.

EXAMPLE NO. 3

Two sample flours made from durum wheat were tested for macaroni and noodle making qualities. These samples were observed and judged on appearance of dough product, cohesiveness, degree of resiliency and absence or presence of stickiness. The results are as follows:

The flour made from the untreated durum wheat made a good cohesive dough and produced a product that has good color and resiliency. This product was subjected to cooking tests and results show it produced a good and acceptable macaroni or noodle product. It has a good bite, good resiliency, and a very slight degree of stickiness. This sample ranks number two in quality evaluation.

Flour made from durum wheat treated for 120 seconds at 20 kw. produces a firm and acceptable dough. The finished product has a good color and good resiliency. This product after cooking has excellent color, good bite, good resiliency, and a minimum of stickiness. This ranks number one in quality.

EXAMPLE NO. 4

A hard wheat sample is microwave-treated for 120 seconds at 20 kw. Flour made from this sample produces an acceptable but slightly sticky dough. The finished product has a poor color but good resiliency. This product, after cooking, shows a moderate degree of stickiness, it has a poor color and fair resiliency or elasticity. This product ranks number three in quality for making macaroni or noodle products to the two flours of example No. 3.

A hard wheat sample is microwave-treated for 300 seconds. Flour from this sample produces a poor and sticky dough with a whitish color. This product, after cooking, shows a high degree of stickiness; poor cohesiveness and poor color. This product is unacceptable for macaroni or noodle products but is usable as cracker, pie and soup flour.

The foregoing evaluation has shown that microwave can control the functional characteristics of flour. Durum wheat used in commercial applications, considered to be good quality, can in fact be made better by microwave treatment, as illustrated in example No. 3. Example No. 4 shows that hard winter wheat, not usually acceptable as macaroni or noodle flour, can make an acceptable product. The wheat of example No. 4 was modified with 300 seconds of microwave treatment, and shows that this wheat can be made into an acceptable cracker, pie and soup flour.

Thus, it is seen that the present invention provides all the objects and advantages sought therefor.

What is claimed is:

1. A process for controlling the functional characteristics of flour comprising the steps of
    A. exposing grain having a moisture content of less than about 20 percent prior to milling to a microwave field,
    B. treating the grain for about 10 sec. to about 10 minutes at a frequency of about 30 MHz. to about 3,000 MHz. and a power level of about 1 kw. to about 1,000 kw. and
    C. Thereafter milling the grain into flour having changed functional characteristics as compared to flour milled from an untreated grain.

2. The process of claim 1 wherein the grain is treated for about 10 to about 120 seconds at a frequency of about 915 MHz. to about 2450 MHz. and a power level of about 10 kw. to about 50 kw. to increase the baking volume of flour milled from the grain over flour milled from an untreated grain.

3. The process of claim 1 wherein the grain is hard wheat.

4. The process of claim 1 wherein the grain is soft wheat.

5. The process of claim 1 wherein the grain is durum wheat.

6. The process of claim 1 wherein the final temperature of the treated grain is from about 90° F. to about 161° F.

* * * * *